Oct. 22, 1935.    S. E. RICHESON    2,018,419
APPARATUS FOR COOKING
Filed Jan. 17, 1933    6 Sheets-Sheet 1

Inventor
Sanford Elmore Richeson
By R. P. Schulze Attorney

Oct. 22, 1935.  S. E. RICHESON  2,018,419
APPARATUS FOR COOKING
Filed Jan. 17, 1933   6 Sheets-Sheet 6

Inventor
Sanford Elmore Richeson
By
R. P. Schulze  Attorney

Patented Oct. 22, 1935

2,018,419

UNITED STATES PATENT OFFICE 2,018,419

APPARATUS FOR COOKING

Sanford E. Richeson, New York, N. Y., assignor to Musa Balluteen, Brooklyn, N. Y.

Application January 17, 1933, Serial No. 652,241

25 Claims. (Cl. 53—7)

This invention relates to improvement in cooking apparatus and, more particularly, it relates to apparatus for the completely automatic frying, draining and seasoning, if desired, of edible materials.

It is an object of this invention to provide improvements in the type of machines adapted to feed a predetermined quantity of materials at predetermined intervals into a frying chamber which include novel means for preventing breakage or crushing of these materials during their feeding into the cooking chamber and their withdrawal therefrom.

A further object provides for novel improvement in the manner of frying materials in a body of heated liquid whereby a minimum amount of heat is wasted and whereby a maximum amount of cooking efficiency is obtained from the heated liquid.

A further object includes novel means for applying salt or the like to the cooked materials after they have been discharged from the cooking chamber and drained which is entirely automatic and highly efficient in operation.

The invention also includes other features to be explained and consists of the novel construction, combination and arrangement of parts herein described and illustrated in the accompanying drawings wherein:

Figure 1:
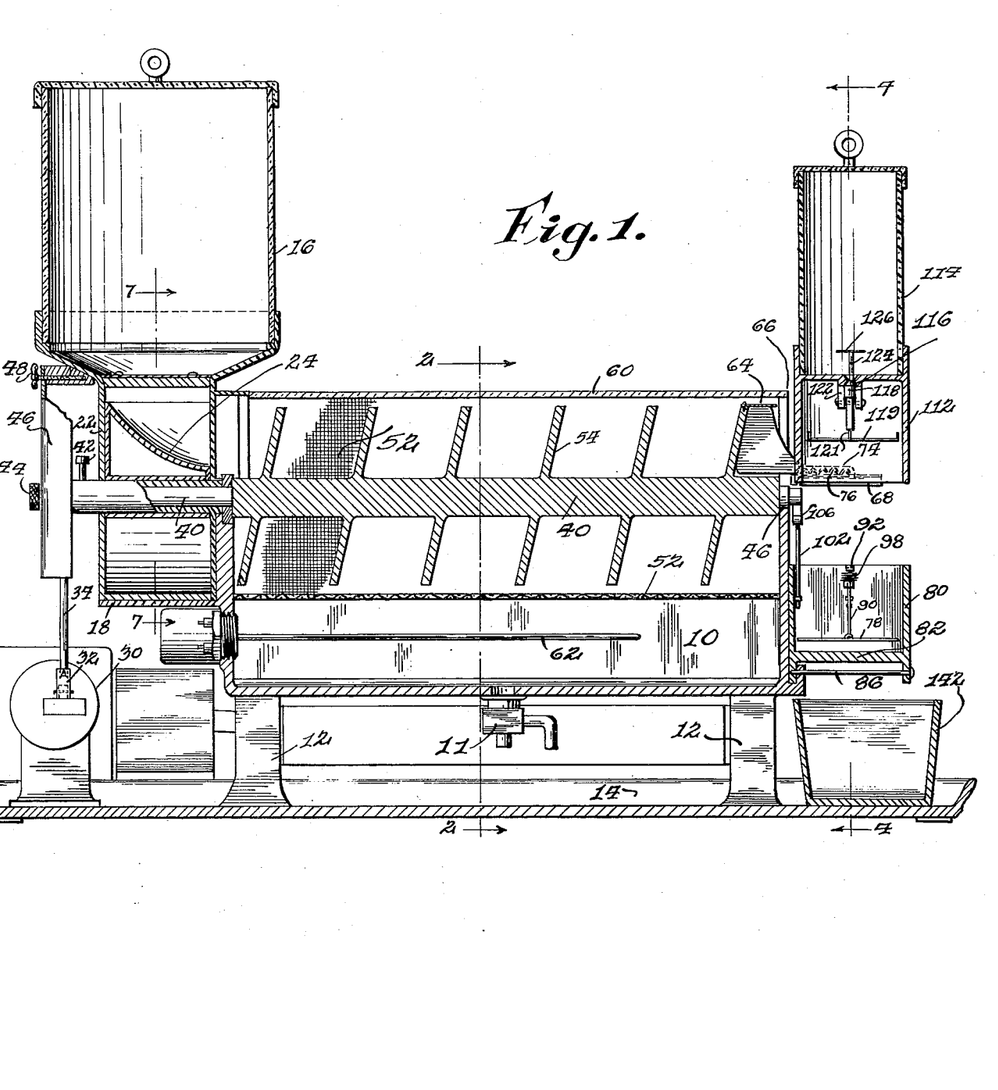
Figure 1 is a longitudinal sectional view of my improved machine.
Figure 5:
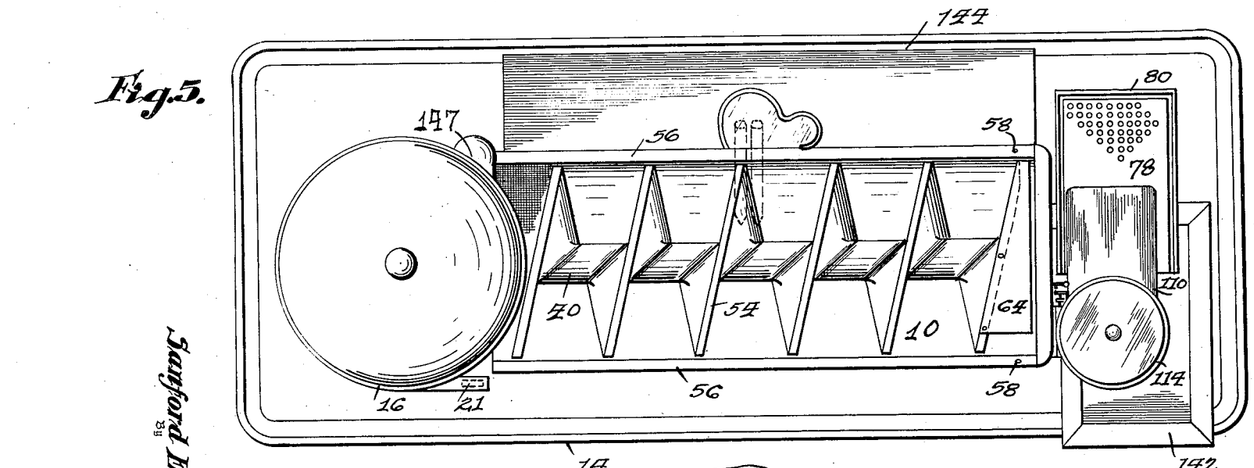
Figure 5 is a top plan view with the tank cover removed.
Figures 7, 8, 9, 10, 11:
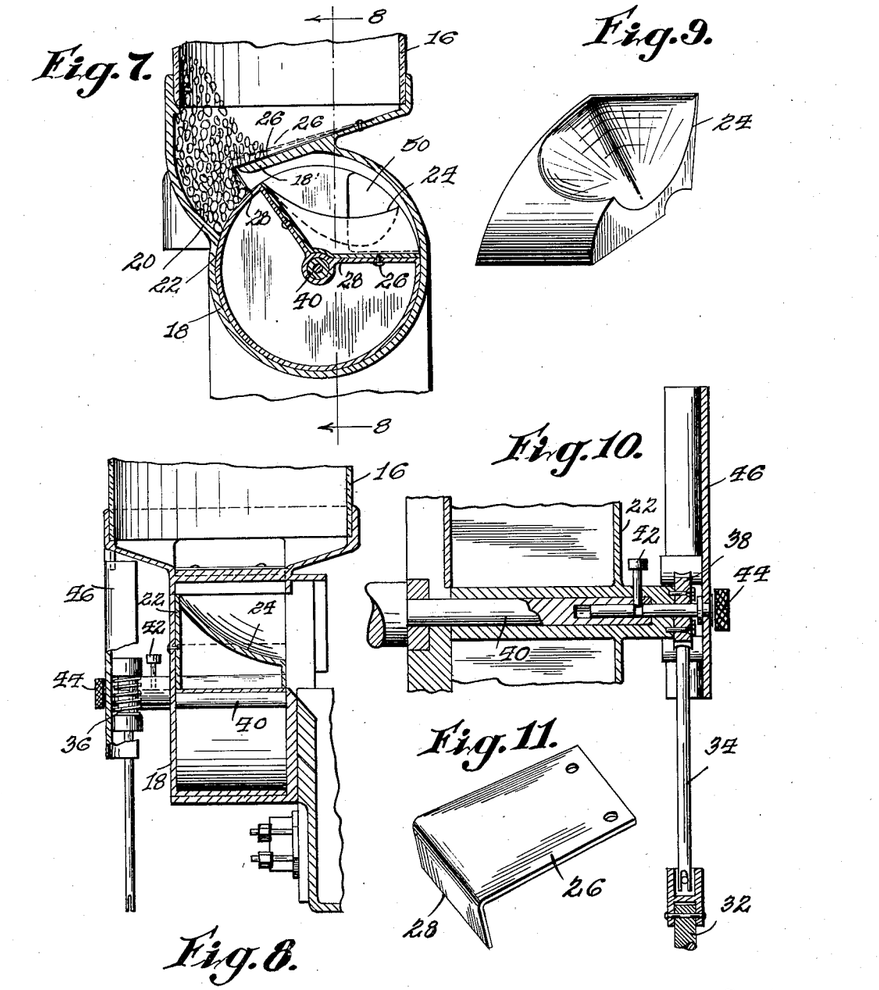
Figure 7 is a fragmentary vertical sectional view taken on line 7—7 of Figure 1.
Figure 8 is a sectional view taken on line 8—8 of Figure 7.
Figure 9 is a perspective view of a removable feeding drum cup.
Figure 10 is a sectional view showing the hopper end of the spiral shaft, its motor connection and guide plate.
Figure 11 is a perspective view of the trigger associated with the feeding means.

Referring more particularly to the drawings, the machine comprises a tank 10, having a drain valve 11, which tank contains a body of heated liquid and is mounted by means of legs 12 upon a suitable base 14. Adjacent one end of tank 10 is the means for feeding the raw material to be fried, which consists of a hopper or storage chamber 16 mounted upon a housing 18 and communicating therewith through a constricted orifice 20. Housing 18 is preferably detachable from the tank and may be so attached thereto by any suitable means such as a tongue and socket as shown at 21 in Figure 5, similar attaching means on the opposite of the tank not being shown. Rotating within the housing and communicating with the hopper 16 through orifice 20 is a drum 22 which is adapted to carry a feeding cup 24 attached by screws 226 to a suitable receiving portion 28. A novel feature of the machine resides in the fact that feeding cups 24 may be of varying capacities and are readily interchangeable so that any predetermined amount of material may be measured therein and fed thereby into the tank for treatment. Another novel feature resides in the trigger 26 attached to the housing 18 adjacent orifice 20. Trigger 26 is formed of resilient material, preferably spring metal, and has a lip 28 extending downwardly toward the periphery of the drum 22. Its function is to scrape from the top of feeding cup 24 any surplus material which is likely to be pressed and crushed against the housing wall or the edges of the orifice upon the continued rotation of the drum. This trigger member is of particular advantage when nuts, especially cashew nuts, are fed into the machine as it will prevent breakage, a serious and common defect occurring in prior apparatus of similar character. Dotted lines 26' in Fig. 7 show the position of trigger 26 in the function of pushing back surplus nuts from the feeding cup. To further assist in preventing breakage, the drum enclosing portion of housing 18 is not cylindrical, a space being provided between projecting ledge 18' at orifice 20 and the periphery of cylindrical drum 22, continuing up to the end of discharge aperture 50. Thus, any surplus nuts, not leveled from the feeding cup, will discharge from the drum through aperture 50 as it rotates therepast before there is any danger of these nuts being crushed against the housing wall.

Electric motor 30 having drive shaft 32 is adapted to rotate the feeding drum by means of an extension shaft 34 which carries worm 36 and gear 38 carried by the driven shaft 40 which passes through the axis of the feeding drum. Set screw 42 pins said feeding drum to driven shaft 40 so as to rotate it therewith and the whole assembly is held together by screw 44 which passes through a rigid guide plate 46 securely fixed to the drum housing at 48.

A novel feature consists in making the feeding means above described readily detachable from the remainder of the machine as my invention comprehends the adaptability of the apparatus hereinafter referred to in detail to cook or fry materials other than nuts and the like and, for which, feeding means of a modified form must be provided.

The feeding drum above described is adapted to rotate clockwise, receiving its charge of material from the hopper as it passes thereunder and discharging at the next quarter revolution into the tank or frying chamber through aperture 50 in the end wall of the tank. The material thus fed will fall into the body of the heated liquid contained in tank 10 and will be prevented from falling to the bottom of the tank by means of screen 52, which is partially submerged in the heated liquid and semi-cylindrical in form to cover the lower half of spiral 54 formed integral with the driven shaft 40. Screen 52 is provided with flanges 56 adapted to overlie the rim of tank 10 and is positioned thereto by pins 58. Covering the upper half of spiral member 54 and serving as a cover for the entire tank is a semi-cylinder 60 formed preferably of glass or other transparent material which is adapted to rest upon the screen flanges 56 overlapping the rim of the tank.

The cooking oil or other liquid is heated by coil 62 which is positioned in the lower portion of tank 10, spaced from the bottom, and extends parallel with the lower portion of the screen 52 and likewise parallel with the path of the material being fried as it is conveyed over said screen by spiral 54. Herein is involved another novel feature of the invention as I have found that the hottest portion of the liquid lies directly above the heating coil, and it is through this hottest portion that I convey the material to be fried, thus gaining the maximum efficiency from the heated liquid. I have found further that disposing the heating coil in this position, equidistant from the side walls and above the bottom of the tank, will create a continuous circulation of liquid by causing the cooler liquid adjacent the side walls and bottom of the tank to flow in toward the coil to replace the hotter liquid rising above the coil.

Figure 14:
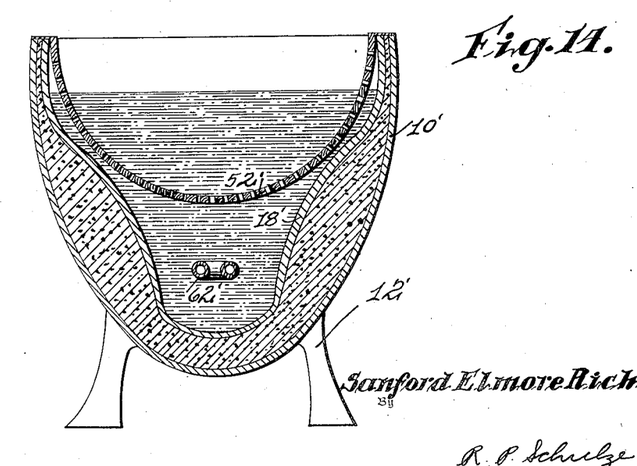
Figure 14 is a modified form of tank in cross section.

A modified form of tank and cooking chamber is shown in cross-section in Figure 14. Herein the tank outer walls 10″ which surround the cooking liquid assume substantially the shape shown throughout the entire length of the tank. The space between inner and outer walls is packed with any suitable heat-insulating material. The advantages of this modified form of tank are that a much smaller quantity of cooking liquid is required to fill the tank and the shape of the inner walls, with respect to the position of the heating coil 62′ and the cooking chamber bottom 52′ over which the material being cooked is conveyed, is such that there results a more rapid circulation of the heated liquid, as described above.

The speed of spiral 54 is adjusted so that the material will be conveyed thereby through the body of liquid for a sufficient length of time to complete the cooking of the material.

Upon reaching the discharge end of the chamber the cooked material is scooped from the bottom of the screen and raised from the liquid by means of a scoop plate 64 which is carried by the last blade of the spiral member 54 and discharged therefrom through aperture 66 in the end wall of the tank. Plate 64 extends from the spiral blade at an angle slightly greater than the perpendicular so that on its upward revolution and when registering with the discharge aperture of the tank, it will form a chute, down which the fried material will fall and be discharged from the tank.

Figure 6:
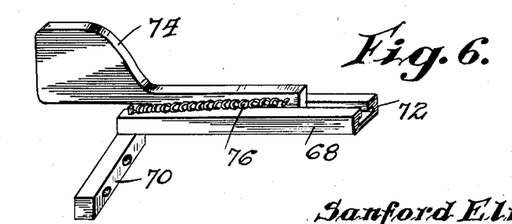
Figure 6 is a perspective view of the scraper mechanism.

In some instances, the material scooped up and raised to a discharging position by plate 64 will adhere to the liquid which coats the plate and spiral members, and instead of discharging, will be carried through the liquid and overcooked. To prevent this occurrence, I provide means positioned adjacent the discharge aperture of the tank, which is adapted to scrape the material from the spiral blade and scoop plate attached thereto and insure its complete discharge from the tank. This novel means, which is shown in enlarged perspective in Figure 6, consists of arm 68 attached to the end wall of the tank adjacent its discharge aperture 66 by bracket 70. Groove 72 in arm 68 serves as a guide for scraper plate 74 which is held in an extended position by spring 76 to engage the spiral blade and plate as they rotate past.

As hereinbefore stated, an outstanding feature of my improved machine comprises novel means for draining the cooked material as it is discharged from the cooking chamber, automatically dropping it after a sufficient interval into a receiving pan, and at this instant, automatically sprinkling salt, sugar or a like substance, upon the cooked material after it has fallen into the receiving pan. The discharged cooked material falls from the tank or cooking chamber by gravity upon a perforated drain plate 78 which constitutes a false bottom for a drain pan 80 which has a bottom 82 sloping toward part 84 to permit escape of the drained liquid and is pivotally fastened to the tank at 86. Drain plate 78 is hingedly attached at 88 to the bottom of the pan and is spacedly supported from said bottom by rod 90 which projects downwardly from arm 92 pivoted to the upper side wall of the pan. Member 94, carried by arm 92, and adjustable member 96 are circuit closing contacts which lead to the automatic salter operating mechanism. Contact 94 is held normally out of engagement with contact 96 by spring 98 and, when a quantity of cooked material has been discharged upon drain plate 78 which is of sufficient weight to counterbalance spring 98, contact members 94 and 96 are brought into engagement, and close the circuit. Contact member 96 is adjustable by screw 100 so that the weight of a sufficient quantity of cooked material necessary to close said contacts can be predeterminately varied as desired.

Dumping of the material from the above described drain pan is effected by means of lever 102 pivoted to the tank at 104. This lever is pressed downward on each revolution of the spiral 54 by cam 106 attached to an extremity of driven shaft 40 which extends beyond the end wall of the tank. Lever 102 then presses forward against pin 108 projecting from the side of the pivoted drain pan 80 to tilt the pan and discharge the drained material therefrom. Cam 106 is positioned upon the revolving shaft 40 in such a manner that it is adapted to engage lever 102 and dump pan 80 only after all of the cooked material which has been withdrawn from the bottom of the cooking chamber by one revolution of scoop plate 64 has been discharged out of the tank and into the drain pan 80.

Figures 3, 12:
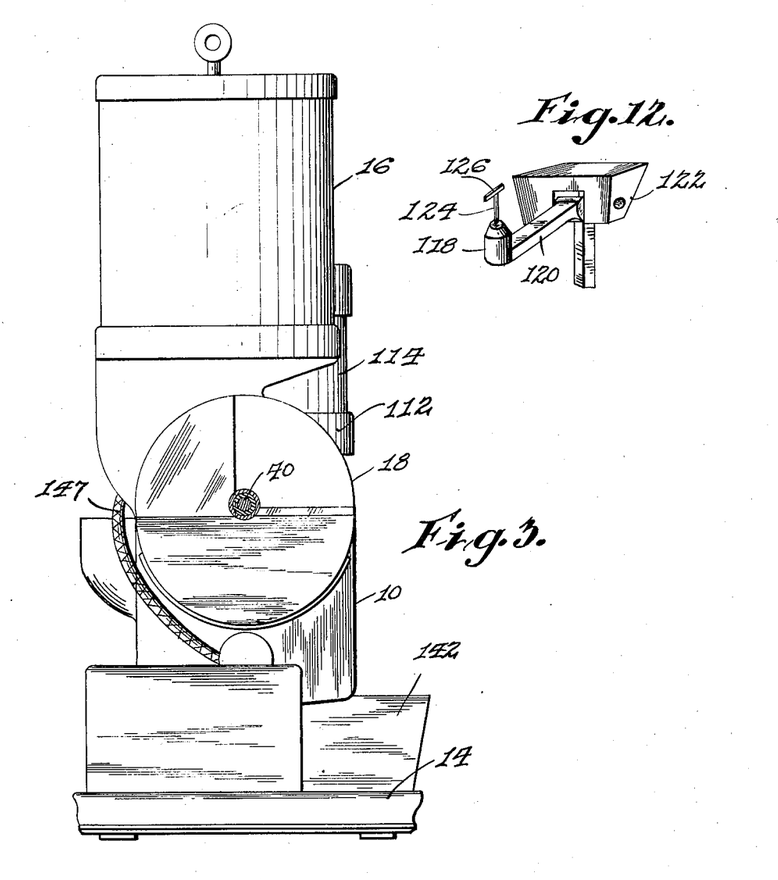
Figure 3 is an elevation looking at the hopper end with motor connection omitted.
Figure 12 is a perspective view of the salter shaker.
Figure 4:
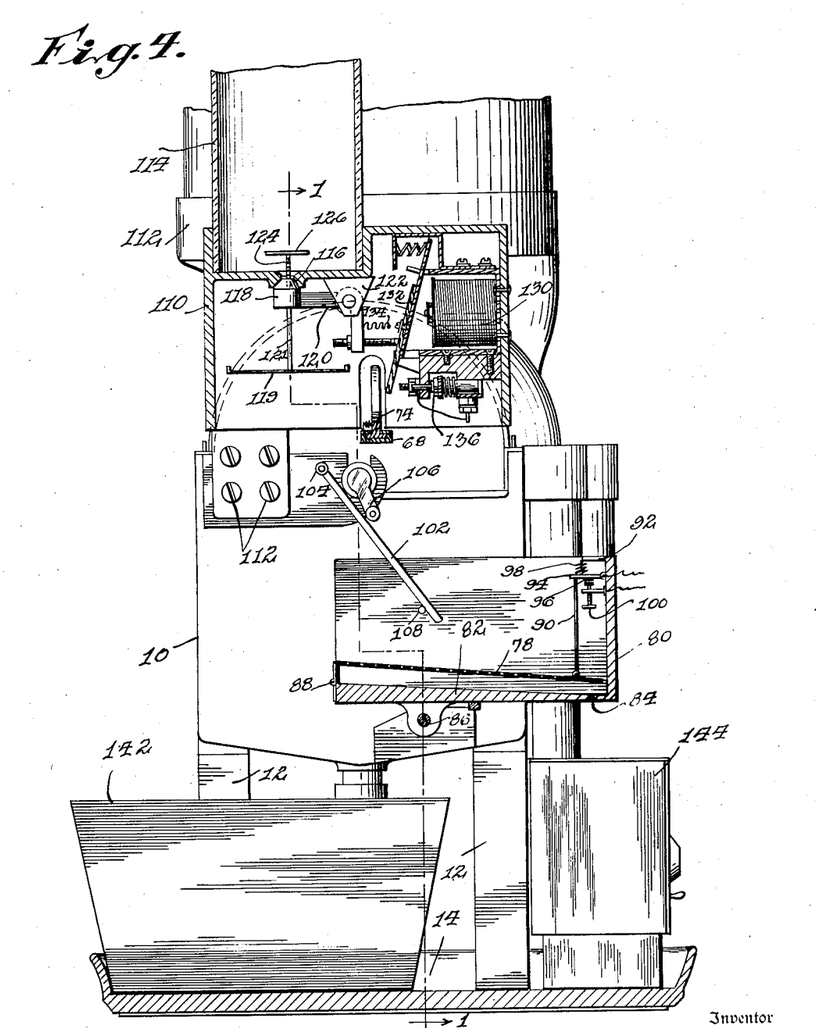
Figure 4 is a fragmentary sectional view taken on line 4—4 of Figure 1.

The salting or other seasoning apparatus, hereinbefore referred to, comprises a bottomless housing 110 securely fastened by screws 112 to the wall of the discharge end of tank 10. This housing is provided with a recess to support a hopper 114 for salt or the like, said recess having an aperture 116, preferably tapered, through which the salt discharges. Seated upon the tapered aperture 116 is a valve 118 which, as clearly shown in Figure 12, is carried at one end of a rocker arm 120 pivoted at its vertex, in block 122 which is secured to said housing adjacent salt discharge aperture 116. A novel feature of this valve arrangement consists of a threaded screw member 124 which projects into the salt container and which carries at its extremity a transversely extending bar 126 which is adapted to agitate a portion of the body of salt and break up the lumps. The threaded portion of screw 124 is adapted to assist in withdrawing the salt to discharge it from the container when valve 118 is removed from its seat. Carried at the bottom of valve 118 by means of rod 121 is a perforated distributing plate 119 upon which the salt falls and whereby it is distributed over the area of the receiving pan.

My preferred mode of operation of the salting apparatus comprises the use of a solenoid 130, of usual construction, which is fastened to an inner wall of housing 110'. The current entering solenoid 130, which is in the same circuit as that described in connection with the drain pan 80, hereinbefore, magnetizes the same and draws toward it bar 132 which permits spring 128 to swing rocker arm 120, whose movement is adjusted by screw 134, away from the salt discharging aperture 116 thus unseating valve 118 and permitting salt to discharge. A spring switch 136 is shown adjacent the solenoid and is connected in the circuit above described. When bar 132 is drawn to the magnetized solenoid, its outer end will press against switch 136, break the circuit, demagnetize the solenoid, release bar 132, force rocker arm 120 back and seat valve 118 to check the discharge of salt. Spring switch 136 will then close, closing the circuit and a repetition of the above steps result. It will thus be seen that the operation of the salter is very rapid and simulates, in effect, a shaking action whereby salt is discharged upon the cooked material as it falls under the salt containing hopper in a finely divided stream.

Figure 13:
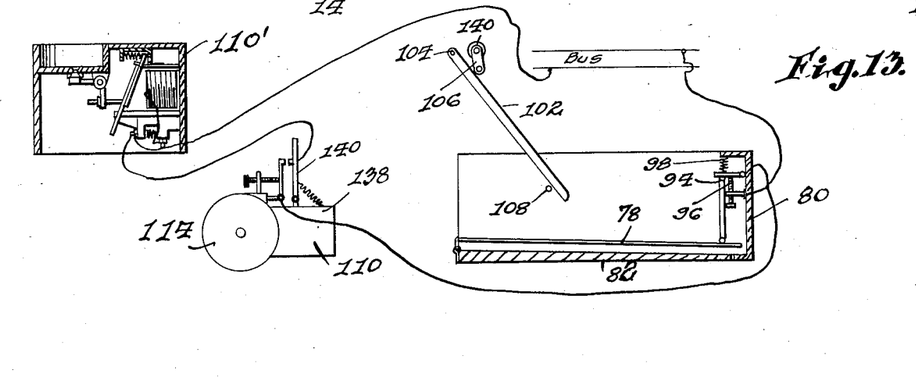
Figure 13 is a diagrammatical view showing the electrical connections.

To synchronize the operation of this salting mechanism with that of the discharge of cooked material from the tilted drain pan, I provide in the electric circuit, which is shown diagrammatically in Figure 13, an intermediate switch 138 having a hinged arm 140 which carries a contact member. Switch 138 is attached to the discharge end of tank 10 in proximity to cam 106 carried by the end of shaft 40 and is so positioned that the cam 106, which forces the tilting of the drain pan, will also bear against hinged arm 140 of the switch closing the circuit therethrough. The operation is such that immediately after discharging of the cooked material from the tank upon drain plate 78, cam 106 presses against hinged arm 140 closing the circuit through switch 138 and operating the salting mechanism. Salt is sprinkled upon the bottom of pan 142 immediately before the drained material falls thereon thus coating the bottom side of the material with salt. The next operation of the salting mechanism coats the top side so the material in the receiving pan is thoroughly salted. It will now be clear that the various parts above described in detail will be operated in a synchronized manner and entirely automatically.

Figures 2, 15:
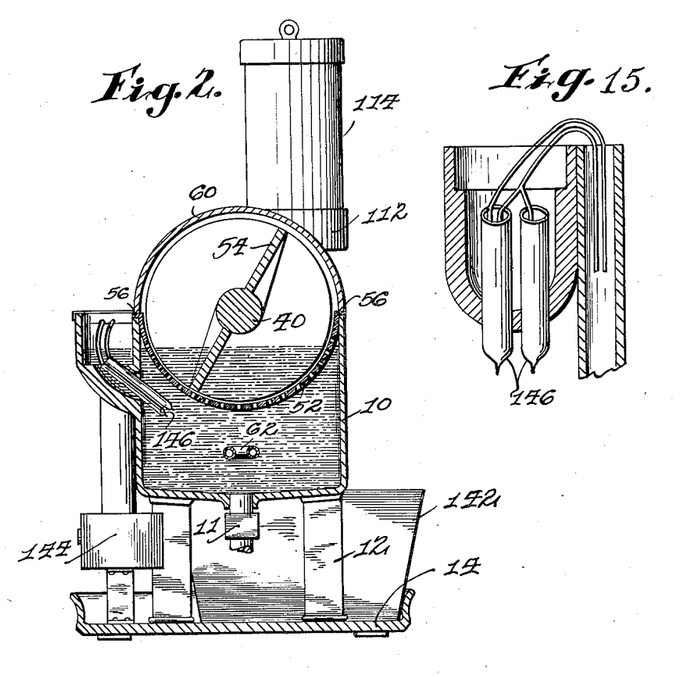
Figure 2 is a section taken on line 2—2 of Figure 1.
Figure 15 is a sectional view showing the thermostatic elements and connections.

As stated hereinbefore, the operation of my entire machine is automatic and continuous and, in this connection, I provide a control box 144 in which is suitable means, not shown, for controlling the speed of motor 30 and likewise the length of time during which the material undergoing cooking is held in the body of cooking liquid by the speed of rotation of the motor driven spiral. I also provide suitable means such as thermostatic tube elements 146 which extend into the body of the heated liquid from a casing adjacent the tank as shown in Figure 15 for the purpose of maintaining the cooking liquid at more or less constant temperature. One of these tubes is sensitive at the minimum degree of heat and the other at the maximum degree of heat to which the liquid in the tank will be subjected, either to be turned on as desired. I prefer that tubes 146 be adapted for a fine variance, for example one degree centigrade. One tube may be operable at 320 degrees F. at which temperature peanuts are cooked and the other tube operable at 295 degrees F. at which temperature other nuts are cooked. The tubes thus will operate to cut the heating element in and out so that the cooking liquid will be maintained more or less constant at either of the above temperatures or any other predetermined temperature.

Means may be provided such as a magnet operating on the heater line (not shown) to cut in a resistance to the motor feed as the heater is turned off and cut out the resistance as the heater is turned on. This would permit a small universal motor to operate at a continuous speed where a 15 ampere heater is operated in the same line.

The cooking or frying operation hereinbefore described in detail inevitably creates in the cooking chamber a certain amount of smoke and fumes, which, unless some provision were made for their disposal, would cloud the transparent top of the cooking chamber, leak out and cause much annoyance. My novel means of exhausting these waste products consists of a tube 147 which communicates with the interior of the cooking chamber at one end and, at the other end with a suction fan, preferably attached to the drive shaft of the electric motor. Through this tube the smoke and fumes will thus be withdrawn from the cooking chamber and can be blown by the fan through a small chamber of activated carbon or other similar means not shown.

In a specific operation of my improved machine, I set the speed of the shaft which drives the feed drum and spiral at one revolution a minute and charge into the cooking chamber six ounces of cashew nuts by means of a measuring cup of suitable size affixed to the feeding drum, maintaining the temperature of the cooking liquid at 295 degrees F. Six minutes will be required for complete frying of the nuts at which time they will be automatically discharged from the tank, drained and salted also automatically, ready for consumption. This operation, of course, may be continuous as long as desired.

While I have referred herein to maintaining a body of heated liquid in my improved cooking apparatus and frying the food materials therein, it is within the understanding of my invention that the body of heated liquid may be dispensed with as it is obvious that the apparatus which I have described herein may be equally well adapted to operate as a dry roaster if desired.

It is to be understood that various modifications may be made in the apparatus and process herein described without departing from the scope of the invention as defined in the following claims.

The term "foraminous" as used in the claims is intended to embrace partition members having preformed perforations therethrough as well as materials of porous structure.

I claim:

1. In combination, a cooking chamber, a body of heated liquid maintained therein, means for conveying articles of food through said body of heated liquid, a drain pan for receiving said food and means actuated by said conveying means discharging said food from said drain pan.

2. In combination, a cooking chamber, a body of heated liquid maintained therein, means for conveying articles of food through said cooking chamber while said food is being cooked, a drain pan exterior of the cooking chamber for receiving said food and means actuated by said conveying means for discharging said food from said drain pan.

3. In combination, a cooking chamber, a body of heated liquid maintained therein, means within said cooking chamber for conveying articles of food therethrough while said food is being cooked, said conveying means operating to discharge said cooked food from said chamber, a drain pan exterior of the cooking chamber for receiving said food and means actuated by said conveying means for discharging the food from said drain pan.

4. In combination, a cooking chamber, a body of heated liquid maintained therein, means for conveying articles of food through said cooking chamber while said food is being cooked, a drain pan unexposed directly to the heat of said cooking chamber for receiving said food and means actuated by said conveying means for discharging said food from said drain pan.

5. In combination, a cooking chamber, a body of heated liquid maintained therein, means for conveying food through said liquid, a drain pan for receiving said food, means for discharging the food from said drain pan, means for applying a seasoning material to the food discharged from said drain pan and means actuated by said discharge means for actuating said seasoning means.

6. In a cooking vessel holding heated liquid, a foraminous partition dividing the vessel into a heating compartment and a cooking compartment, liquid heating means submerged in said liquid and extending substantially parallel with said partition, and means for conveying material to be cooked through said cooking compartment.

7. In a cooking vessel holding heated liquid, a foraminous partition dividing the vessel into a heating compartment and a cooking compartment, liquid heating means submerged in said liquid and extending substantially parallel with said partition, and means for continuously conveying separated charges of food to be cooked through said cooking compartment.

8. In a cooking vessel holding heated liquid, a foraminous partition dividing the vessel into a heating compartment and a cooking compartment, liquid heating means submerged in said liquid and extending substantially parallel with said partition, and means for conveying material to be cooked over the surface of said partition.

9. In a cooking vessel holding heated liquid, a foraminous partition dividing the vessel into a heating compartment and a cooking compartment, liquid heating means submerged in said liquid and extending substantially parallel with said partition, and means for continuously conveying separated charges of food to be cooked over the surface of said partition.

10. In a cooking vessel holding heated liquid, a partition submerged in said liquid and dividing the vessel into a heating compartment and a cooking compartment, means to convey material to be cooked over the surface of said partition, and means for effecting a cyclic flow of heated liquid from the heating compartment to and from the cooking compartment.

11. In a cooking vessel, a foraminous partition dividing the vessel into a heating compartment and a stationary cooking compartment, a body of heated liquid maintained in said vessel, means for continuously conveying material to be cooked through said liquid, and means for effecting a cyclic flow of substantially all of the heated liquid from the heating compartment to and from the cooking compartment.

12. In a cooking vessel holding heated liquid, a foraminous partition submerged in said liquid and dividing the vessel into a heating compartment and a stationary cooking compartment, means for continuously conveying material to be cooked over the surface of said partition and means for effecting a cyclic flow of heated liquid from the heating compartment to and from the cooking compartment.

13. In a cooking vessel, a foraminous partition dividing the vessel into a heating compartment and a stationary cooking compartment, a body of heated liquid maintained in said cooking compartment, means for continuously conveying material to be cooked through said liquid, and means for effecting a cyclic flow of heated liquid from the heating compartment to and from the cooking compartment, the walls of said vessel being formed so as to facilitate said cyclic flow of liquid.

14. In a cooking vessel, a foraminous partition dividing the vessel into a heating compartment and a stationary cooking compartment, a body of heated liquid maintained in said cooking compartment, means for continuously conveying material to be cooked through said liquid, and means for effecting a cyclic flow of heated liquid from the heating compartment to and from the cooking compartment in a direction substantially transverse to the direction of the passage of said material.

15. In a cooking vessel, a foraminous partition dividing the vessel into a heating compartment and a stationary cooking compartment, a body of heated liquid maintained in said cooking compartment, means for feeding charges of food to said cooking compartment, means for continuously conveying said food through said cooking compartment while maintaining said charges separated, and means to effect a cyclic flow of heated liquid from the heating compartment to and from the cooking compartment.

16. In a cooking vessel holding heated liquid, a foraminous partition submerged in said liquid and dividing the vessel into a stationary heating compartment and a cooking compartment, means for feeding charges of food to said cooking chamber, means for continuously conveying said food over the surface of said partition while maintaining said charges separated, and means for effecting a cyclic flow of heated liquid from the heating compartment to and from the cooking compartment.

17. In combination, a cooking chamber, a body of heated liquid maintained therein, means for conveying food through said liquid, a drain pan for receiving said food, means actuated by said conveying means for discharging the food from said drain pan, and means actuated by said conveying means for applying a seasoning material to said food.

18. In combination, a cooking chamber, a spiral conveyor for passing food over the bottom of said cooking chamber, and a scoop carried by said spiral to discharge said food at a point above the bottom of said chamber.

19. In combination, a cooking chamber, a spiral conveyor for passing food over the bottom of said cooking chamber, a scoop carried by said spiral to discharge said food at a point above the bottom of said chamber, and means disposed adjacent the point of discharge to effect the discharge of food from said scoop.

20. In a cooking vessel holding heated liquid, a foraminous partition dividing the vessel into a heating compartment and a cooking compartment, liquid heating means submerged in said liquid and extending substantially parallel with said partition throughout a substantial portion of the length of the partition, and means for conveying material to be cooked through said cooking compartment.

21. In a cooking vessel holding heated liquid, a foraminous partition dividing the vessel into a heating compartment and a cooking compartment, liquid heating means submerged in said liquid and extending substantially parallel with said partition throughout a substantial portion of the length of the partition, and means for continuously conveying separated charges of food to be cooked over the surface of said partition.

22. In a cooking vessel holding cooking liquid, a foraminous partition dividing the vessel into a heating compartment and a cooking compartment, means for conveying material to be cooked through said cooking compartment and a relatively narrow elongated means within the heating compartment for heating said liquid, said heating means extending a substantial portion of the length of said cooking compartment.

23. In combination, a cooking chamber, means for draining food cooked in said chamber, means for discharging food from said draining means, means for applying seasoning material to said food and means actuated by said discharge means for operating said seasoning means.

24. In combination, a cooking chamber, means for draining food cooked in said chamber, means for discharging food from said draining means and means actuated by said discharge means for applying a seasoning material to the food.

25. In combination, a cooking chamber, means for draining food cooked in said chamber, means for discharging food from said draining means, a body of seasoning material adjacent the point of said discharge and means actuated by said discharge means for agitating said seasoning material and applying the same to the food.

SANFORD E. RICHESON.